Nov. 2, 1926.  
F. F. SCOVILLE  
1,605,074  
AUXILIARY ENGINE SUSPENSION FOR LOCOMOTIVES  
Filed Sept. 28, 1922 2 Sheets-Sheet 1
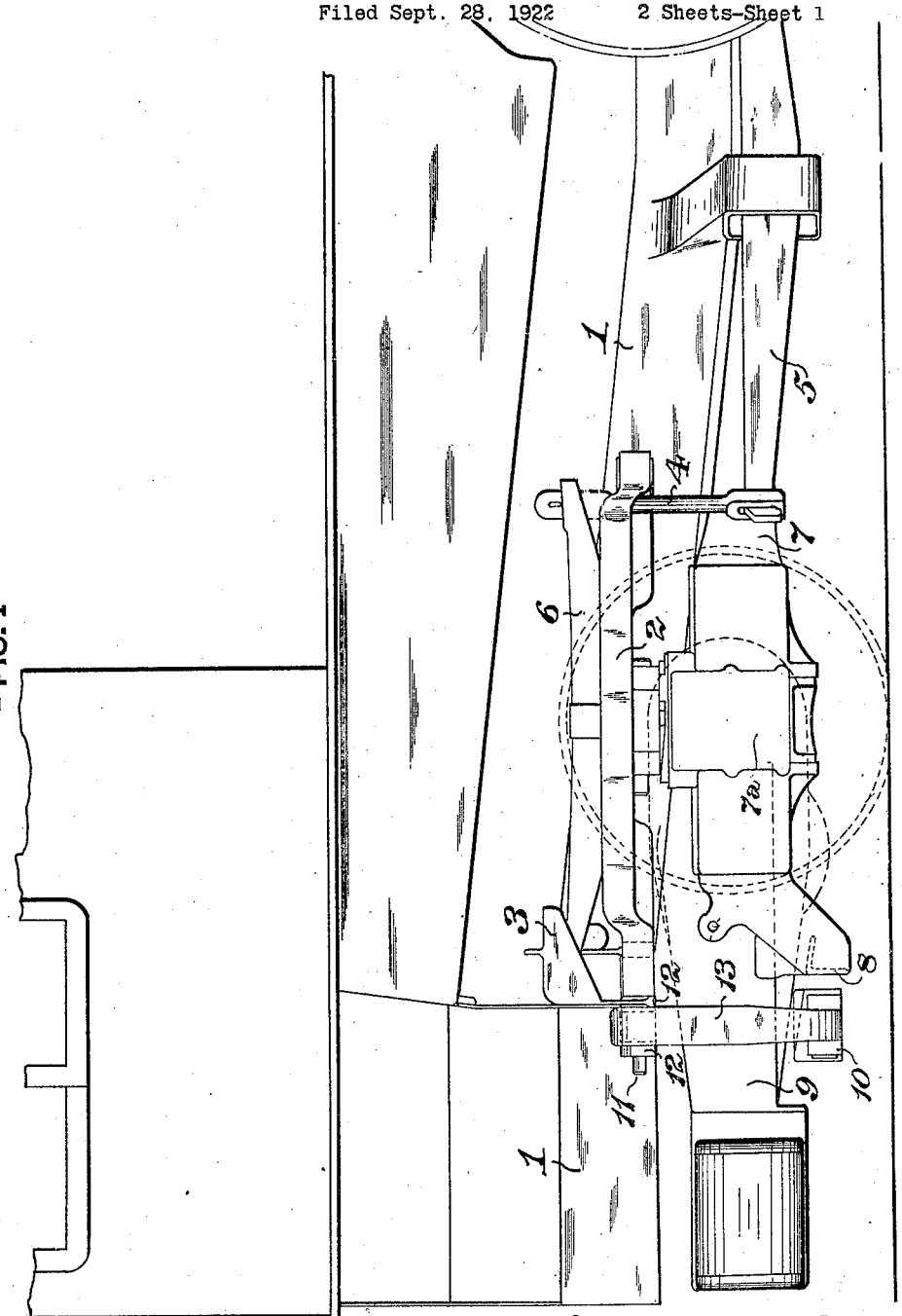
- FIG. 1 -
WITNESSES  
INVENTOR Nov. 2, 1926.
F. F. SCOVILLE
1,605,074
AUXILIARY ENGINE SUSPENSION FOR LOCOMOTIVES
Filed Sept. 28, 1922    2 Sheets-Sheet 2
- FIG. 2 -
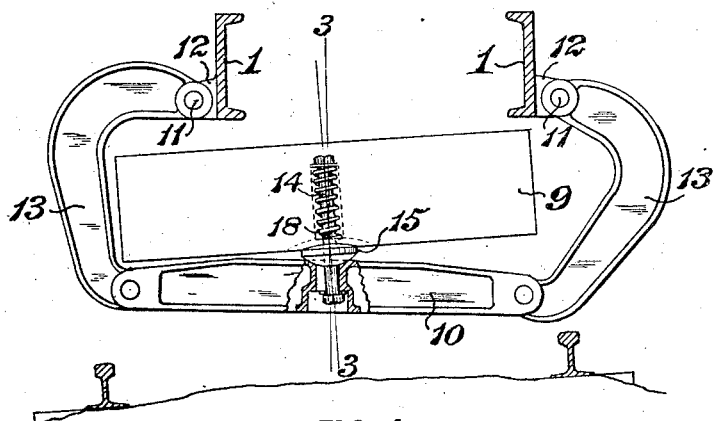
- FIG. 3 -
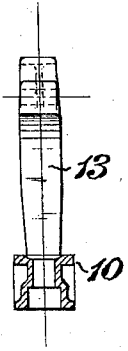
- FIG. 4 -
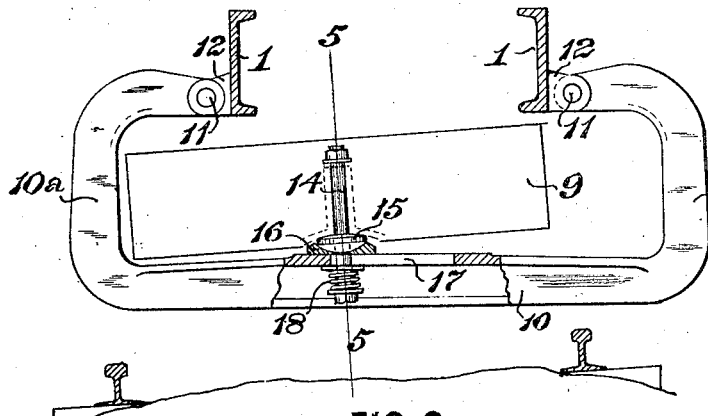
- FIG. 5 -
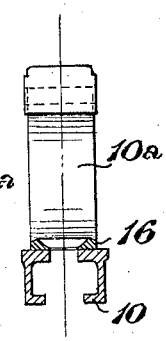
- FIG. 6 -
WITNESSES
INVENTOR
Frank F. Scoville Patented Nov. 2, 1926.

1,605,074

UNITED STATES PATENT OFFICE.

FRANK F. SCOVILLE, OF SCHENECTADY, NEW YORK.

AUXILIARY ENGINE SUSPENSION FOR LOCOMOTIVES.

Application filed September 23, 1922. Serial No. 591,049.

My invention relates to means for supporting the auxiliary or so-called booster engine, as applied to the trailing truck of a locomotive.

Where the auxiliary engine is applied to a trailing truck of the type in which the journal boxes are formed integral with or rigidly attached to the side members of the trailing truck frame, it is desirable that the weight of the auxiliary engine should be supported from the main frame or some spring supported part of the locomotive, and the object of my invention is to provide an improved suspension device for this purpose, which shall, at the same time, permit a lateral swinging movement of the booster relative to the main frame.

The improvement claimed is hereinafter fully set forth.

In the accompanying drawings: Figure 1 is a side view, in elevation, of the rear end portion of a locomotive, with trailing truck and auxiliary engine, and one form of auxiliary engine suspension, embodying my invention; Fig. 2, a transverse section of the rear portion of the engine frame, showing one type of suspension; Fig. 3, a section, taken on the line 3—3 of Fig. 2; Fig. 4, a section, similar to Fig. 2, but showing a structural modification; Fig. 5, a section, taken on the line 5—5 of Fig. 4; and, Fig. 6, a horizontal section of the modification shown in Fig. 4.

My invention is exemplified as applied in connection with a type of trailing truck in which the journal boxes are formed integral with, or rigidly attached to, the truck frame, and the drawings illustrate a well known form of trailing truck, having side frame members, 7, pivoted, at their forward ends, to a swivel pin connection on the main frame of the locomotive, said side members being rigid with the journal boxes, 7ª, and having a rear transverse connecting member, 8. The trailing truck springs, 6, which are mounted on spring seats supported on the journal boxes, bear, at their rear ends, in a member, 3, of the main frame, 1, while their forward ends are connected by the usual hangers, 4, and equalizer, 5, with the spring rigging system of the locomotive. The positions of the spring seats are also controlled by the usual yoke, 2, pivotally attached at its rear end to the main frame, 1, by means of a pin, 11, mounted in the lugs, 12.

In the usual practice, the frame, 9, of the auxiliary engine or booster, is mounted, at its front end, on journals surrounding the trailing truck axle, while the main support for the booster is located toward the rear.

In the practice of my invention, the main support for the booster comprises a beam, 10, extending transversely beneath the booster frame, 9, and supported, at its ends, by suspension members pivotally attached, at their upper ends, to the main frame, 1. In the construction shown in Figs. 2 and 3 the suspension members for the beam are indicated as hook-shaped links, 13, having their lower ends pivotally connected to the ends of the beam, 10, and their upper ends mounted on the pivot pins, 11, of the yoke, 2. For this purpose, the pins, 11, may be made of sufficient length, and supported by another set of lugs, 12, on the main frame.

In the structural modification shown in Figs. 4, 5 and 6, the suspension members for the beam, 10, are formed of rigid or integral projecting hook-shaped arms, 10ª, mounted, at their upper ends, on the pins, 11. Each of these constructions allows for a lateral swinging movement of the booster, and in order to prevent the booster from bouncing off its bearing upon the beam, 10, a clamping bolt, 14, is suitably mounted, in the booster frame and extends through a slot or opening in the beam, 10. As shown in Fig. 2, the booster frame rests upon a washer, 15, having a concave seat at the middle portion of the beam, 10, while in the construction shown in Fig. 4, the washer, 15, is mounted in a concave seat upon a sliding bearing block, 16, the bolt, 14, extending through these parts and through an elongated slot, 17, in the beam, 10. A cushioning spring, 18, may be employed upon the bolt, 14, either within the booster casing, 9, as indicated in Fig. 2, or below the beam, 10, as indicated in Fig. 4.

The booster suspension may be readily detached and taken down by withdrawing the pins, 11, sufficiently to release the hangers, whenever it is desired to remove the truck for any purpose. With the construction shown in Fig. 2, this removal may also be effected by taking out the pins at the lower ends of the links, 13.

When the locomotive is passing through a courve, and bearing down low upon the outer rail, the booster frame may swing laterally, relatively to the main frame, to the position indicated in Figs. 2 and 4, and the suspension parts move freely to the positions shown, to allow for this adjustment. In the construction shown in Fig. 2, the swinging movement of the two link hangers, 13, allows for the lateral motion of the booster frame, while, in the construction of Fig. 4, the booster frame slides laterally upon the block, 16, guided by the bolt, 14, in the slot, 17.

I claim as my invention and desire to secure by Letters Patent:

1. In a locomotive, the combination, with the main frame, and a trailing truck, of an auxiliary engine frame for the trailing truck; a transverse beam beneath said auxiliary engine frame; a washer having a concave seat for supporting said engine frame upon the beam; a clamping bolt extending through said washer; and means, at opposite ends of the beam, for supporting the same from the main frame.

2. In a locomotive, the combination, with the main frame, a trailing truck, a spring for said truck, and a retaining yoke for said spring pivoted to the main frame, of an auxiliary engine frame for the trailing truck; a transverse beam beneath said engine frame; and hangers for said beam, supported upon the same pivot pins with said yoke.

FRANK F. SCOVILLE.